United States Patent [19]

Rivard et al.

[11] Patent Number: 5,987,567
[45] Date of Patent: Nov. 16, 1999

[54] SYSTEM AND METHOD FOR CACHING TEXTURE MAP INFORMATION

[75] Inventors: William G. Rivard, San Jose; Stephanie L. Winner, Santa Clara; Michael W. Kelley, Saratoga, all of Calif.

[73] Assignee: Apple Computer, Inc., Cupertino, Calif.

[21] Appl. No.: 08/723,108

[22] Filed: Sep. 30, 1996

[51] Int. Cl.[6] .................................................. G06F 12/00
[52] U.S. Cl. ........................ 711/118; 711/122; 345/425; 345/430; 345/521; 345/509; 345/501
[58] Field of Search .................................. 345/510, 425, 345/521, 430, 501, 507, 508, 509, 515–516; 711/118, 122

[56] References Cited

U.S. PATENT DOCUMENTS

| | | | |
|---|---|---|---|
| 3,866,183 | 2/1975 | Lange | 395/733 |
| 4,370,710 | 1/1983 | Kroft | 711/128 |
| 4,646,233 | 2/1987 | Weatherford et al. | 711/3 |
| 4,746,979 | 5/1988 | Kashigi | 348/718 |
| 5,097,427 | 3/1992 | Lathrop et al. | 345/430 |
| 5,548,709 | 8/1996 | Hannah et al. | 345/510 |
| 5,579,473 | 11/1996 | Schlapp et al. | 345/501 |
| 5,598,517 | 1/1997 | Watkins | 345/441 |
| 5,706,481 | 1/1998 | Hannah et al. | 395/519 |
| 5,724,560 | 3/1998 | Johns et al. | 345/510 |
| 5,757,374 | 5/1998 | Nakamura et al. | 345/425 |
| 5,760,792 | 6/1998 | Holt et al. | 345/509 |
| 5,761,720 | 6/1998 | Krishnamurthy et al. | 711/140 |
| 5,812,141 | 9/1998 | Kamen et al. | 345/430 |
| 5,821,944 | 10/1998 | Watkins | 345/430 |
| 5,826,095 | 10/1998 | Jordan | 395/800.11 |
| 5,828,382 | 10/1982 | Wilde | 345/425 |

OTHER PUBLICATIONS

Hirota et al., inventors; Fujitsu LTD, assignee. Texture Mapping Processing System Based on Multiprocessor. JP patent 62–140181. 1987 Dec. 3. (English Abstract) Dec. 3, 1987.

*Primary Examiner*—Eddie P. Chan
*Assistant Examiner*—Yamir Encarnación
*Attorney, Agent, or Firm*—Carr & Ferrell LLP

[57] ABSTRACT

A system for caching texel information in a cache data store, for use in a graphics rendering system which uses interpolative sampling to compute texture color values. The system includes a texel memory storing texel information, a graphics application program for using interpolative sampling to compute dynamic texture values, a first cache data storage for a number of the most-recently-retrieved texels, a second cache data storage for a previously-retrieved adjacent line of texels, cache tag blocks for determining whether the texels needed by the graphics accelerator system are cached in either of the first or second cache data stores, and a memory request generator for retrieving texels from texel memory upon indication of a miss by the cache tag blocks.

21 Claims, 17 Drawing Sheets

SYSTEM AND METHOD FOR CACHING TEXTURE MAP INFORMATION

BACKGROUND OF THE INVENTION

1. Field of the Invention

This invention relates generally to data caching, and more particularly to a system and method for caching texture map information in a graphics rendering system.

2. Description of the Background Art

Systems that implement interactive three-dimensional graphics rendering commonly operate by transforming, shading, clipping and projecting three-dimensional geometric data to generate triangles with vertices in two-dimensional coordinates. Typically, these screen space triangles are rasterized by a method called "smooth shading."

FIG. 1 through FIG. 5D illustrate briefly conventional smooth-shading techniques for generating a texture (color) map from picture information. FIG. 1 shows a triangular object T having three vertices, a first at $(X_0,Y_0)$ with a texture value equal to $(U_0,V_0)$, a second at $(X_1,Y_1)$ with a texture value equal to. $(U_1,V_1)$, and a third at $(X_2,Y_0)$ with a texture value equal to $(U_2,V_2)$. The U and V values identify a texture map location to be sampled from a texture map. Arbitrary texture color samples may be linearly interpolated from the vertices of the object T. For illustrative purposes only, a screen space sampling point P at $(X_P,Y_P)$ having texture values $(U_P,V_P)$ is arbitrarily selected.

In order to generate a texture map, planar equations are first computed from the information of FIG. 1. The vertices of the triangle illustrated in FIG. 2 define a planar equation $(a_u x + b_u y + c_u = 0)$ generated conventionally from the known "U" texture values $(U_0, U_1$ and $U_2)$. The vertices of the triangle illustrated in FIG. 3 represent a 10 different planar equation $(a_v x + b_v y + c_v = 0)$ generated conventionally from the known "V" texture values $(V_0, V_1$ and $V_2)$. As illustrated by FIGS. 2 and 3, individual values for U and for V are determinable from the X and Y geometric coordinates for each of the vertices.

FIG. 4A represents a texture map 400 generated conventionally from the planar equations represented by FIGS. 2 and 3. For a particular geometric coordinate in screen space $(X_P,Y_P$, FIG. 1), texture values $U_P$ and $V_P$ can be computed from the planar equations represented by FIGS. 2 and 3 respectively, and, using point sampling or bi-linear sampling, a corresponding texture may be extracted from texture map 400. Using point sampling, the texture represented by texture element (texel) 410 is extracted.

Texture values are generated using bi-linear sampling by texel 420 interpolation as illustrated by FIG. 4B. Namely, a unit square 430 is computed about sampling point S. The bi-linear texture values are determined by interpolating linearly in the U and V directions from the texture values for the vertices of the unit square. As illustrated, the unit square resides within parts of texels A, B, C and D. Interpolation in the horizontal direction is based on U_frac and interpolation in the vertical direction is based on V_frac. Interpolation based on U_frac is performed by adding the fractional color contribution of texel A to the fractional color of texel B, and adding the fractional color contribution of texel C to the fractional color contribution of texel D. The two interpolated U_frac values are in turn interpolated likewise based on the fraction V_frac. The resulting interpolated color value represents the texture color sample to be used for point P.

A reason for performing bi-linear interpolation is to avoid texture "truncation-snapping." That is, as an object moves in screen space, it is undesirable for the re-sampled texture image on that object to jump from one texture sample point to the next on a given pixel of geometry. It is preferable for the re-sampled texture image to move gradually with the geometry from one frame to the next, and this is accomplished using bi-linear sampling.

FIG. 5A illustrates how a mip-mapped texture map (mip-map) 00 is generated. A mip-map 500 includes a set of associated successive texture maps 510 which include incremental levels of detail.

A method for generating a mip-map 500 begins by first obtaining a detailed texture map 520. A less-detailed texture map 540 is generated from detailed map 520 by filtering from texel blocks of the detailed map. A common filter, called a "box" filter, averages a two-by-two block of texels. For example, a texel 550 of a less detailed map 540 may be averaged from four texels 530 of detailed map 520. An even less (the least shown) detailed map 570 may be generated by averaging from less-detailed map 540. For example, texel 560 of least-detailed map 570 may be determined by averaging the four texels of less-detailed map 540. The process of texel averaging typically continues until a map 570 having only one texel is generated. Although FIG. 5A illustrates three levels of detail maps, any number of maps greater than one may be used for mip-mapped sampling.

As an object is rendered, successive (X,Y) coordinates are selected for texture mapping. For a successive (X,Y) coordinate, the sampling point on the texture map moves a distance $\Delta U, \Delta V$, which is referred to as a sampling "stride." The sampling stride is smaller for a less-detailed map. In the FIG. 5A example, the sampling stride (i.e., the length of the arrow from point S to point S1) is reduced by fifty percent from detailed map 520 to less-detailed map 540 and reduced another fifty percent from less-detailed map 540 to least-detailed map 570.

Tri-linear sampling is preferably used to determine the texture color for an example sampling point P in three-dimensional space, although point or bi-linear sampling could be used. Tri-linear sampling, like bi-linear sampling, interpolates textures from surrounding texels. However, tri-linear sampling also interpolates between successive maps 510 of a mip-map 500, to avoid texture truncation snapping as images virtually move nearer or further in the distance. When rendering a three-dimensional image, the virtual distance from the object to the user is determined and used for selecting the level of detail, and thus the texture map, appropriate for rendering the object. For example, detailed map 520 may be used when the virtual distance is closer than 50 meters and less detailed map 540 may be used when the virtual distance is further than 100 meters. FIG. 5B illustrates the bi-linear interpolation equation for detailed map 520 sampling point S, based on u_frac_high and v_frac_high. FIG. 5C illustrates the bi-linear interpolation equation for the next lower detailed map 540 sampling point S, based on u_frac_low and v_frac_low. If the virtual distance is about 75 meters, then a tri-linear texture value for a sampling point $S_f$ halfway between the bi-linear values computed in FIGS. 5B and 5C will preferably be selected. FIG. 5D illustrates the tri-linear sampling point $S_f$, which is generated by linearly interpolating a fraction fs_frac based on the virtual distances of the user's perspective to the image. It will be appreciated that for point or bilinear sampling, the more detailed of the two most appropriate maps is preferably used to obtain a more accurate value.

SUMMARY OF THE INVENTION

The present invention overcomes limitations and deficiencies of previous graphics rendering systems by providing a system and method for caching texture map texels. The invention implements a graphics accelerator system which caches the most-recently-read texels and the adjacent raster line of texels for use in interpolative sampling to compute dynamic texture values.

The system includes a texel memory such as a commodity memory or a dynamic random access memory (DRAM) storing texel information and a memory storing a graphics application program for using interpolative sampling such as bi-linear or tri-linear sampling to render texels on a graphical object. The system further includes a most-recent texel cache data storage for a number of the most-recently-retrieved texels and a line-to-line texel cache data storage for a previously-retrieved adjacent line of texels. The most-recently-retrieved texels and the adjacent line of texels reflect the best estimation of information which will be needed and redundant for the interpolative sampling computations. The system further includes cache tag blocks for determining whether texels needed by the graphics accelerator system are stored in either the most-recent texel cache data storage or in the line-to-line texel cache data storage, and includes a memory request generator for retrieving texels from texel memory upon indication of a miss by the cache tag blocks.

DETAILED DESCRIPTION OF THE PREFERRED EMBODIMENT

The present invention provides a texel caching system and a method for caching a number of the most-recently retrieved texels and the most-recently retrieved line of texels in a graphics rendering system using bi-linear or tri-linear sampling.

Figure 1:
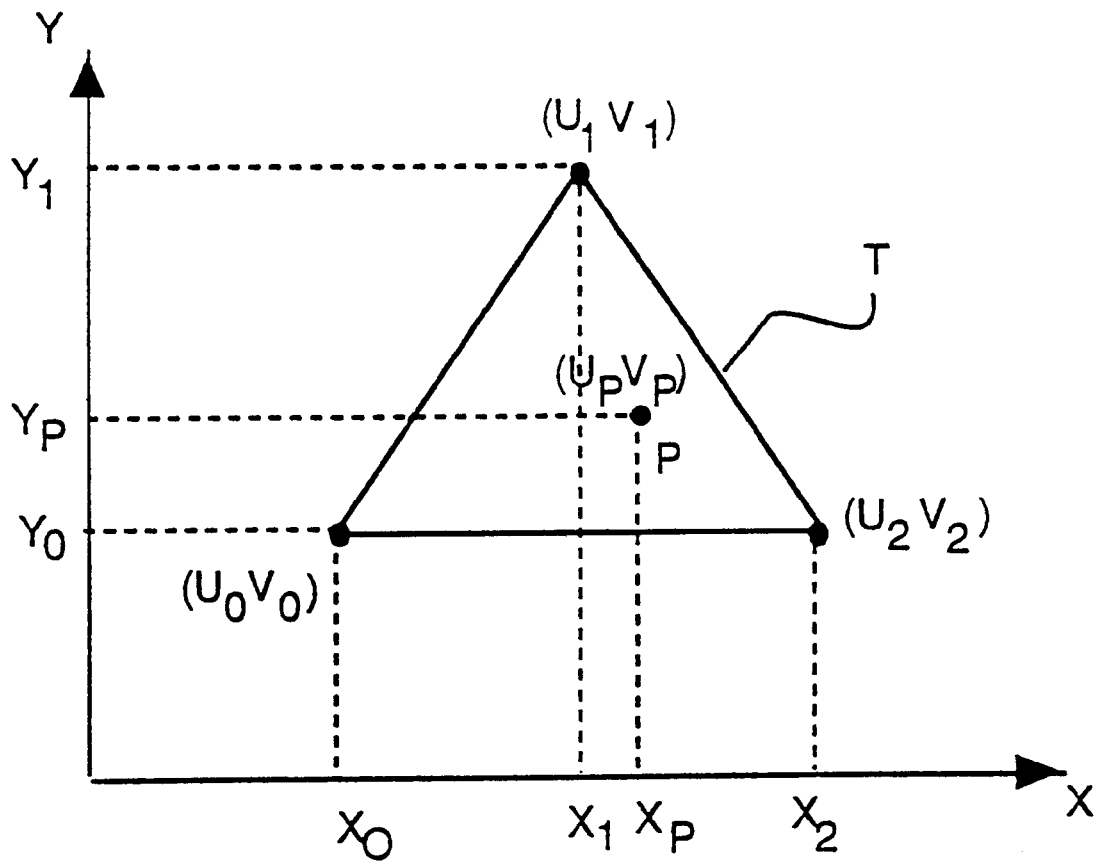
FIG. 1 is a graphical representation of a triangular object T having three vertices, a first at $(X_0,Y_0)$ with a texture value equal to $(U_0,V_0)$, a second at $(X_1,Y_1)$ with a texture value equal to $(U_1,V_1)$, and a third at $(X_2,Y_0)$ with a texture value equal to (U2,V2)
Figure 2:
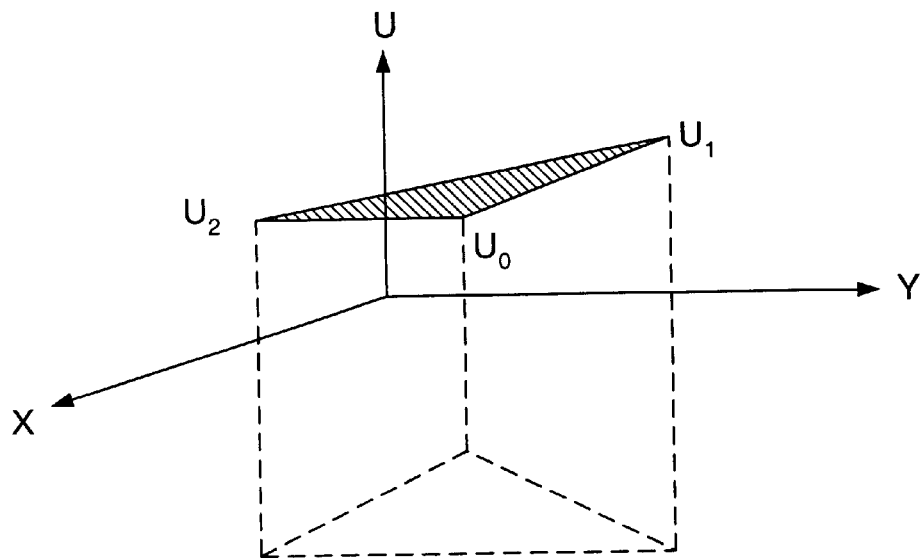
FIG. 2 is a graphical representation of a planar section defining the "U" texture values ($U_0,U_1$ and $U_2$) of FIG. 1.
Figure 3:
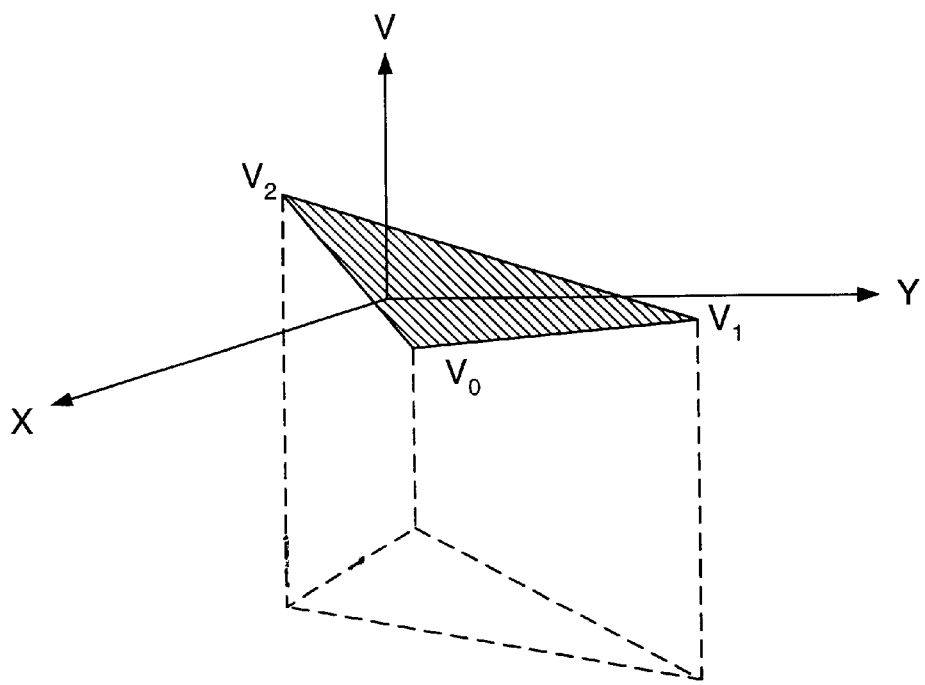
FIG. 3 is a graphical representation of a planar section defining the "V" texture values ($V_0,V_1$ and $V_2$) of FIG. 1.
Figure 4A:
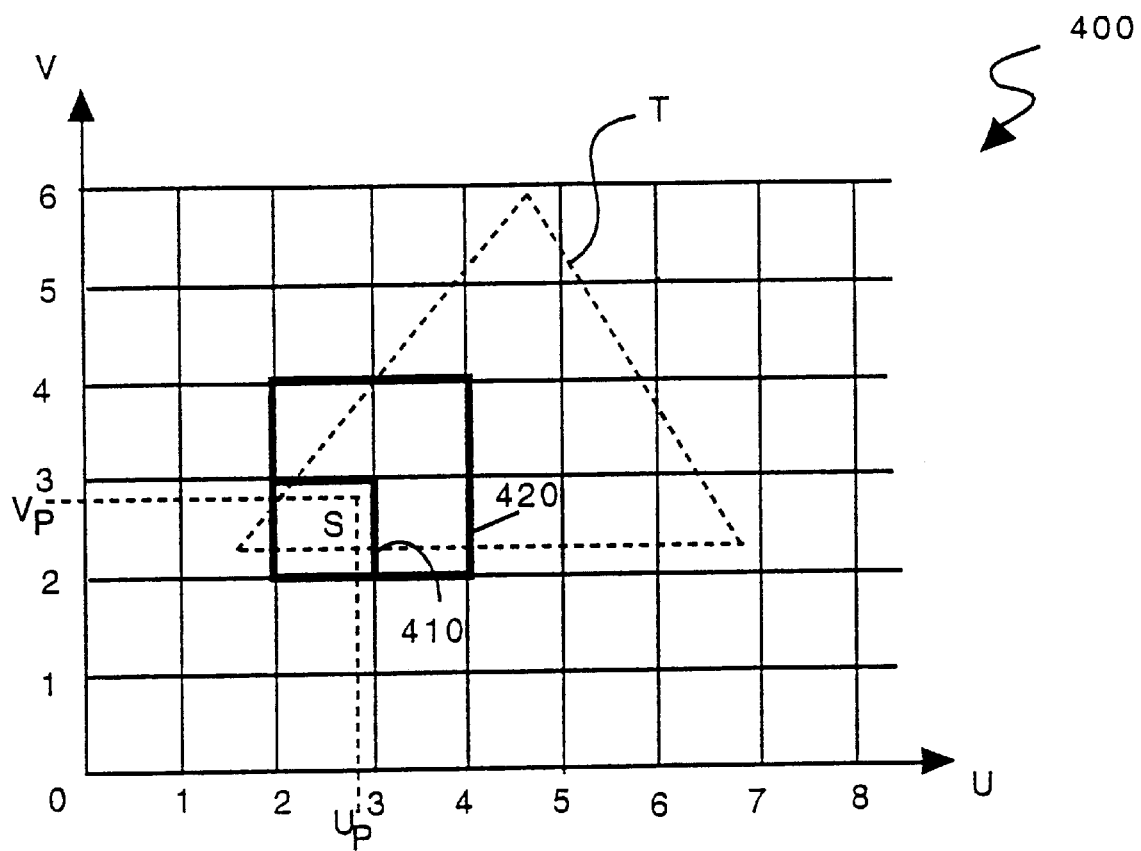
FIG. 4A is a graphical representation of a texture map generated conventionally from the planar equations represented by FIGS. 2 and 3.
Figure 4B:
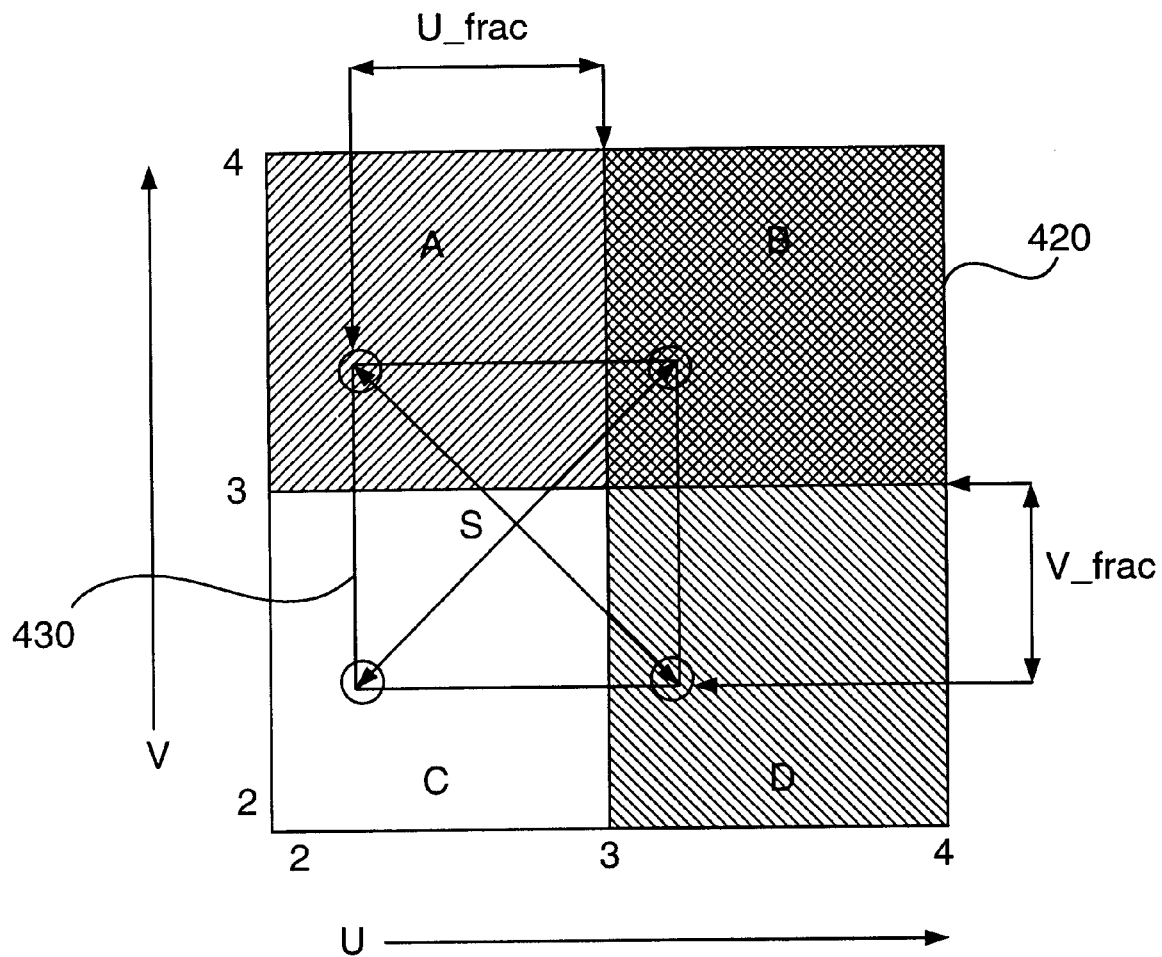
FIG. 4B is an enlarged representation of the FIG. 4A texture map being used for bi-linear sampling.
Figure 5A:
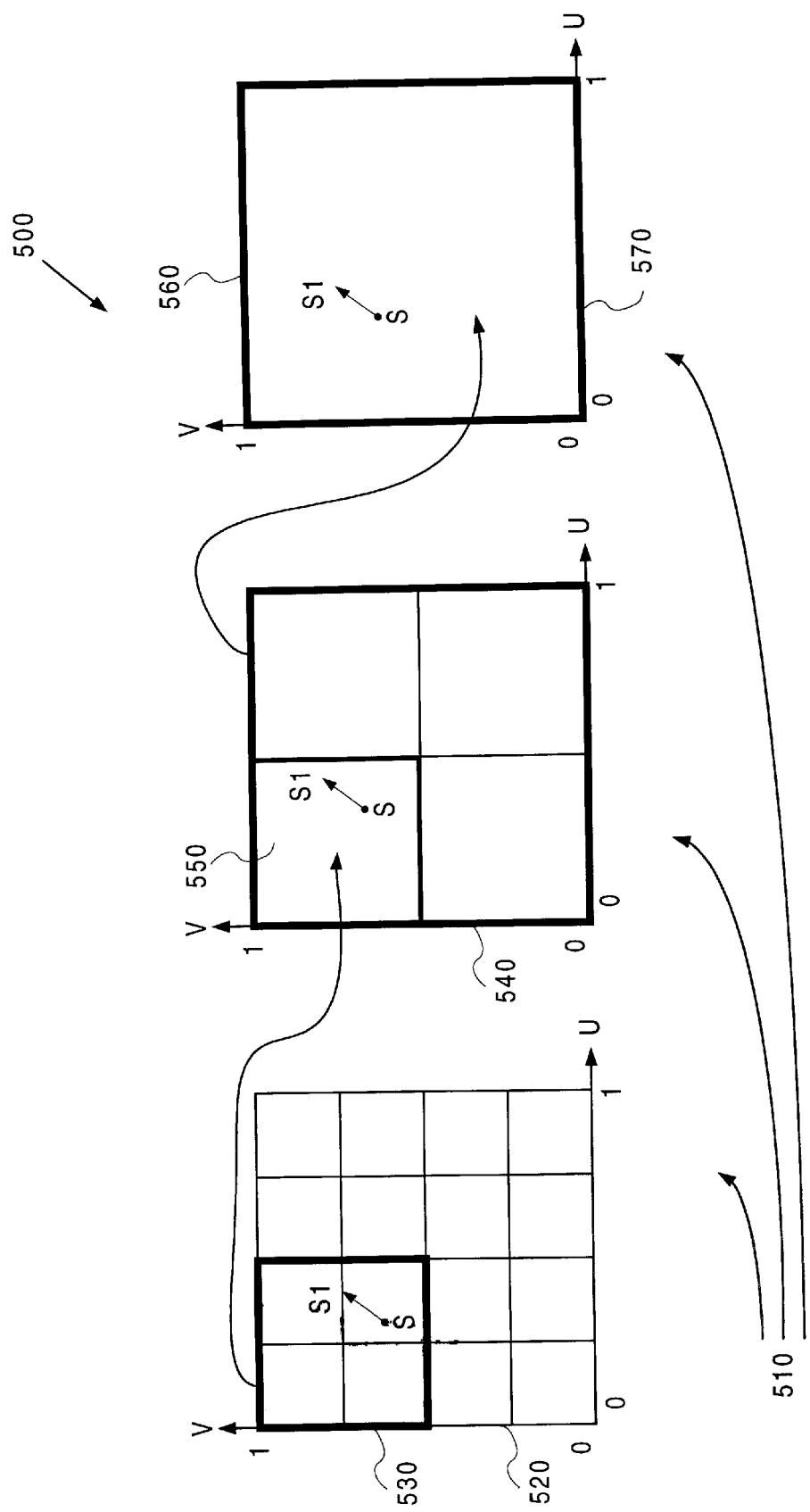
FIG. 5A is a graphical representation of a three-level mip-mapped texture map.
Figure 5C:
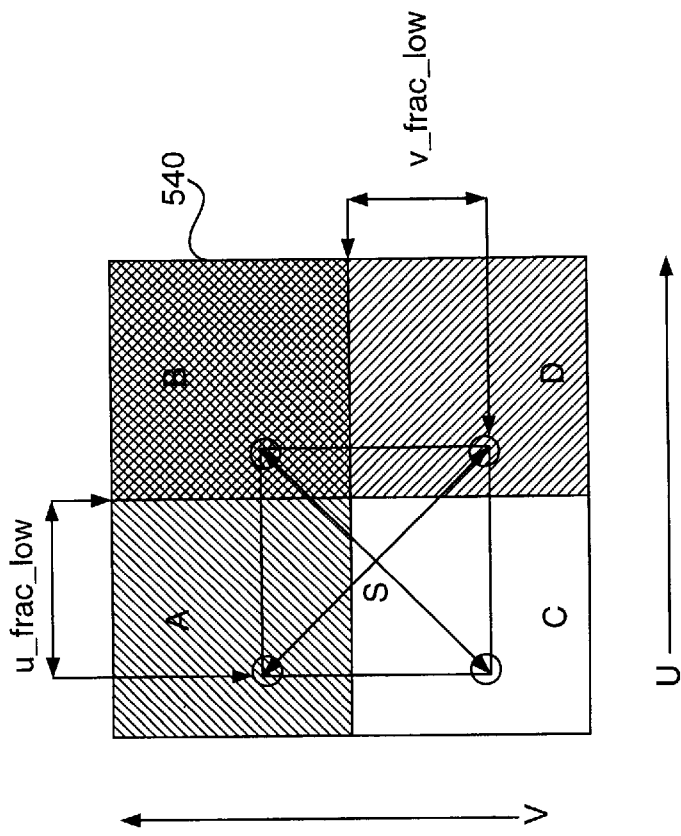
FIG. 5C is a graphical representation of the less-detailed map of FIG. 5A being used for determining a bi-linear interpolated texture value.
Figure 5B:
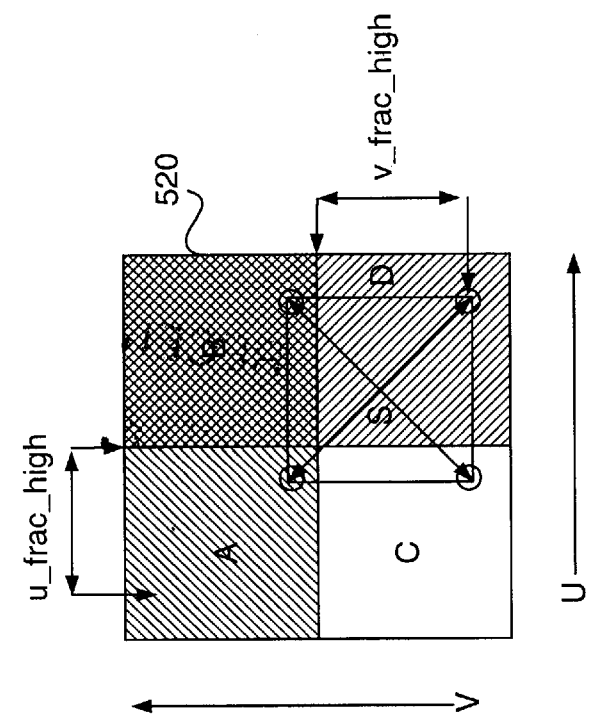
FIG. 5B is a graphical representation of the detailed map of FIG. 5A being used for determining a bi-linear interpolated texture value.
Figure 5D:
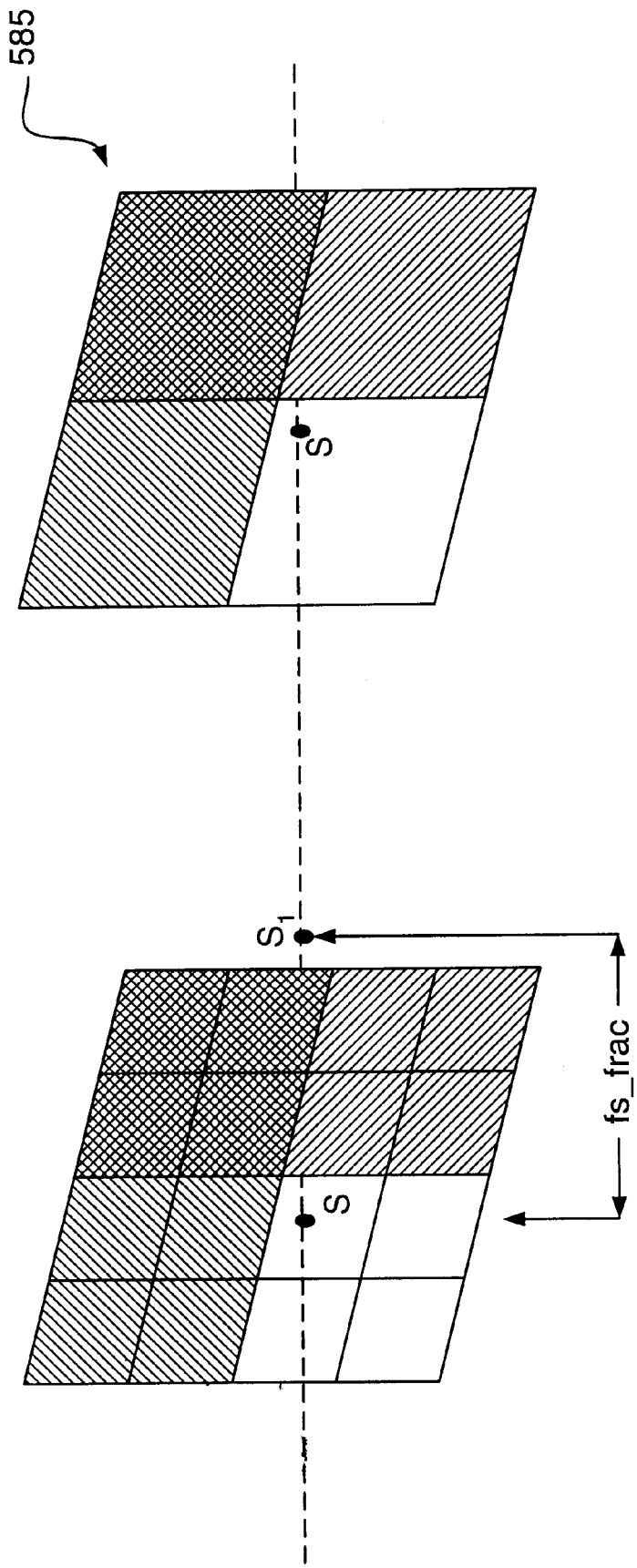
FIG. 5D is a graphical representation of the detailed and less detailed maps of FIGS. 5B and 5C as used for tri-linear interpolation.
Figure 6:
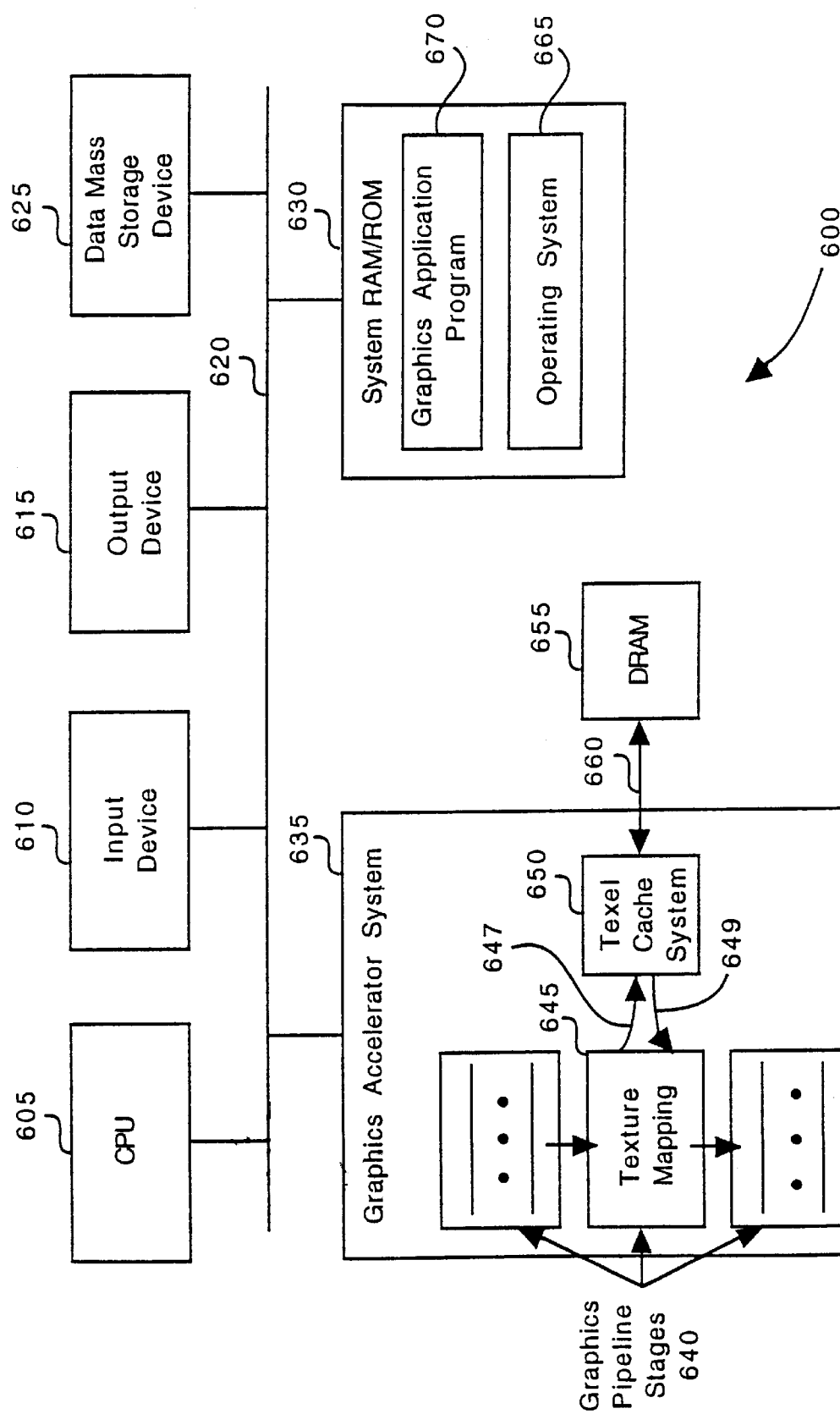
FIG. 6 is a block diagram illustrating a computer system, in accordance with the present invention.

FIG. 6 is a block diagram illustrating a computer system 600, including a CPU 605 based on a computer such as preferably a Power Macintosh manufactured by Apple Computer, Inc. of Cupertino, Calif. An input device 610 such as a keyboard and a mouse, scanner, video camera or laser disk, and an output device 615 such as a Cathode Ray Tube (CRT) display are coupled via a signal bus 620 to CPU 605. A data storage 625 including a hard disk, and a system memory 630 including Read Only Memory (ROM) and Random Access Memory (RAM) are also coupled via signal bus 620 to CPU 605. A graphics accelerator system 635 also is coupled to signal bus 620 and to a RAM data storage device, for example, dynamic RAM (DRAM) 655, for minimizing the number of requests to the DRAM 655. Graphics accelerator system 635 maintains the texels most likely to be requested again, namely, the most-recently retrieved texels and the most-recent line of texels as will be described in greater detail with reference to FIGS. 7–9B and 11.

An operating system 665 is a program that is typically stored in data storage 625 and loaded into RAM 630 for execution to control processing by CPU 605. A graphics application program 670 is a program for rendering images on output device 615, and is also typically stored in data storage 625 and loaded into RAM 630 for execution. Graphics application program 670 transfers graphical information from data storage 625 into DRAM 655 for local storage. Graphics accelerator system 635 includes graphics pipeline stages 640 including a texture mapping stage 645 for mapping texture information to the graphics information received from graphics application program 670 and for maintaining the texel information in a texel cache system 650. Texture mapping block 645 sends information via bus 647 to texel cache system 650, and texel cache system 650 sends information via bus 649 back to texture mapping block 645.

Figure 7:
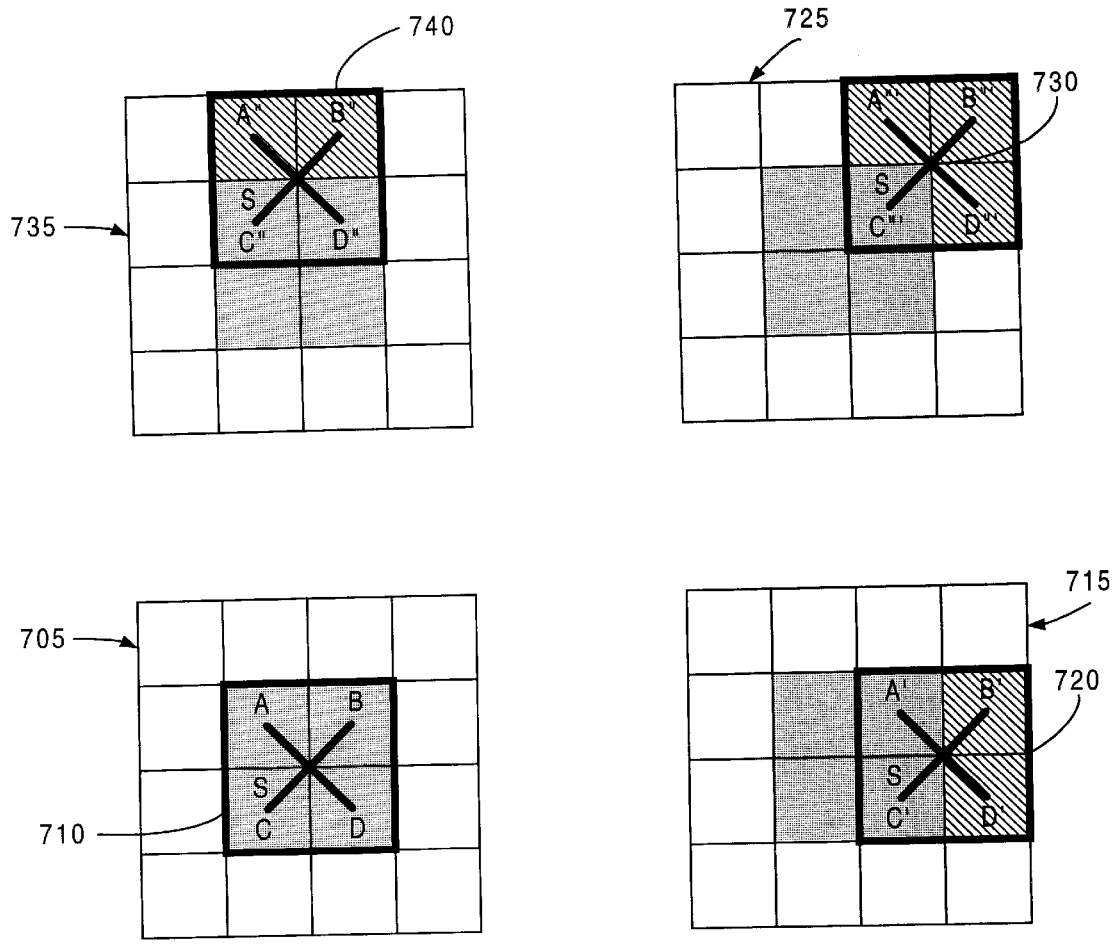
FIG. 7 is a graphical representation of texel access to texture maps illustrating the most-recently retrieved texel redundancy coherence pattern.

FIG. 7 is a graphical representation of texel access to texture maps illustrating the most-recently retrieved texel redundancy coherence pattern as a limited approach to texel caching. Using bi-linear or tri-linear sampling on arbitrary sampling point S, texture map 705 shows the four most recently retrieved texels 710, namely, texels A, B, C and D. Texture map examples 715, 725 and 735 illustrate redundancy patterns of the four most-recently retrieved texels. In texture map 715, the sampling point subsequent to S is to the right of S and requires the retrieval of four texels 720, namely, A', B', C' and D'. Texels A' and C' are the same as most-recently retrieved texels B and D, and thus reflect a fifty percent redundancy.

Similarly, if the sampling point subsequent to S is above and to the right as shown in texture map 725, then the required texels 730 are texels A''', B''', C''' and D'''. Texel C''' is the same as the most recently retrieved texel B, and reflects a twenty-five percent redundancy. If the sampling point moves upward as shown in texture map 735, then the required texels 740 are texels A'', B'', C'' and D''. Accordingly, texels C'' and D'' are the same as the most-recently retrieved texels A and B, and reflect a fifty percent redundancy.

If the sampling point stride is less than the texel-unit step, then it is possible that all four of the most recently retrieved texels may be re-used. If the sampling point S stride is more than a unit texel, it is possible that no texels will be re-used. Most-recently retrieved four-texel caching typically achieves a fifty percent texel redundancy for bi-linear sampling. Since a given resolution map typically has a sampling stride equal to about half that of the next higher resolution map, a seventy-five percent texel redundancy is typically achieved for tri-linear sampling.

Figure 8:
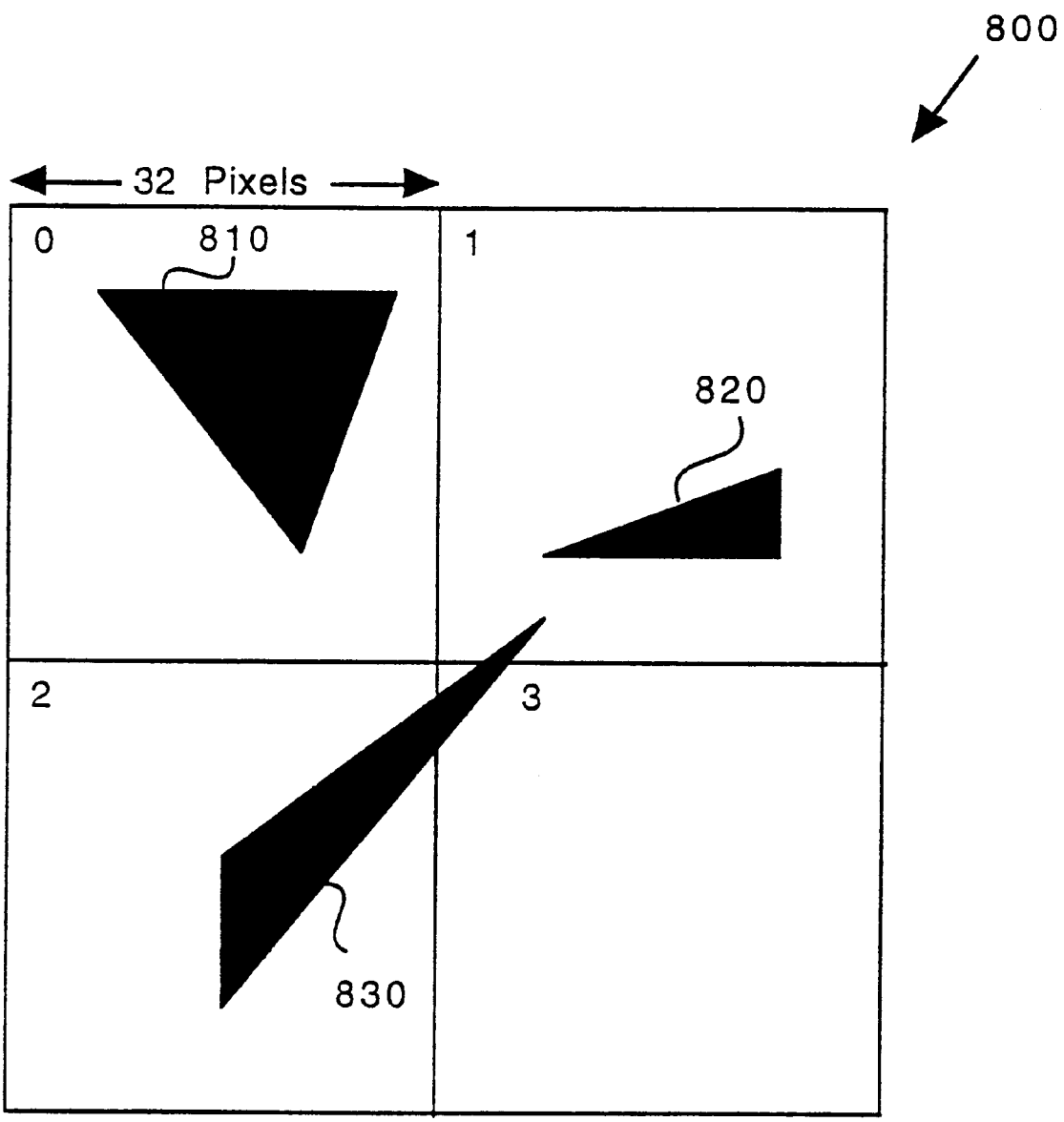
FIG. 8 illustrates partitioning of a screen image.

FIG. 8 illustrates partitioning of a screen image 800. Since successive scan lines are likely to have the advantage of using redundant texels, screen image partitioning avoids computationally expensive caching of an entire line on the screen. Screen image 800 is partitioned into blocks, for example blocks 0, 1, 2 and 3. Block 0 contains triangle 810, block 1 contains triangle 820, and blocks 1, 2 and 3 contain triangle 830. Each block is preferably thirty-two pixels wide, thereby requiring a line-to-line cache sufficiently wide to maintain the texel data for at least the thirty-two pixels. The images in each of blocks 0–3 can be conventionally divided into triangles, representing the partitioned image portion. Further, blocks 0–3 can be rendered in any order.

Figure 9A:
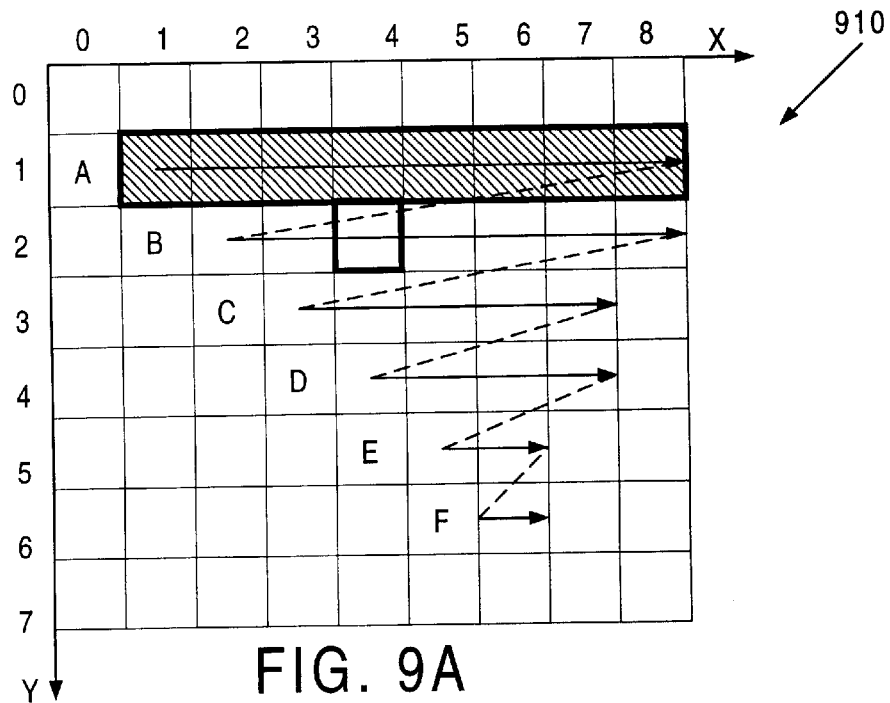
FIG. 9A is a graphical representation of a screen image block.
Figure 9B:
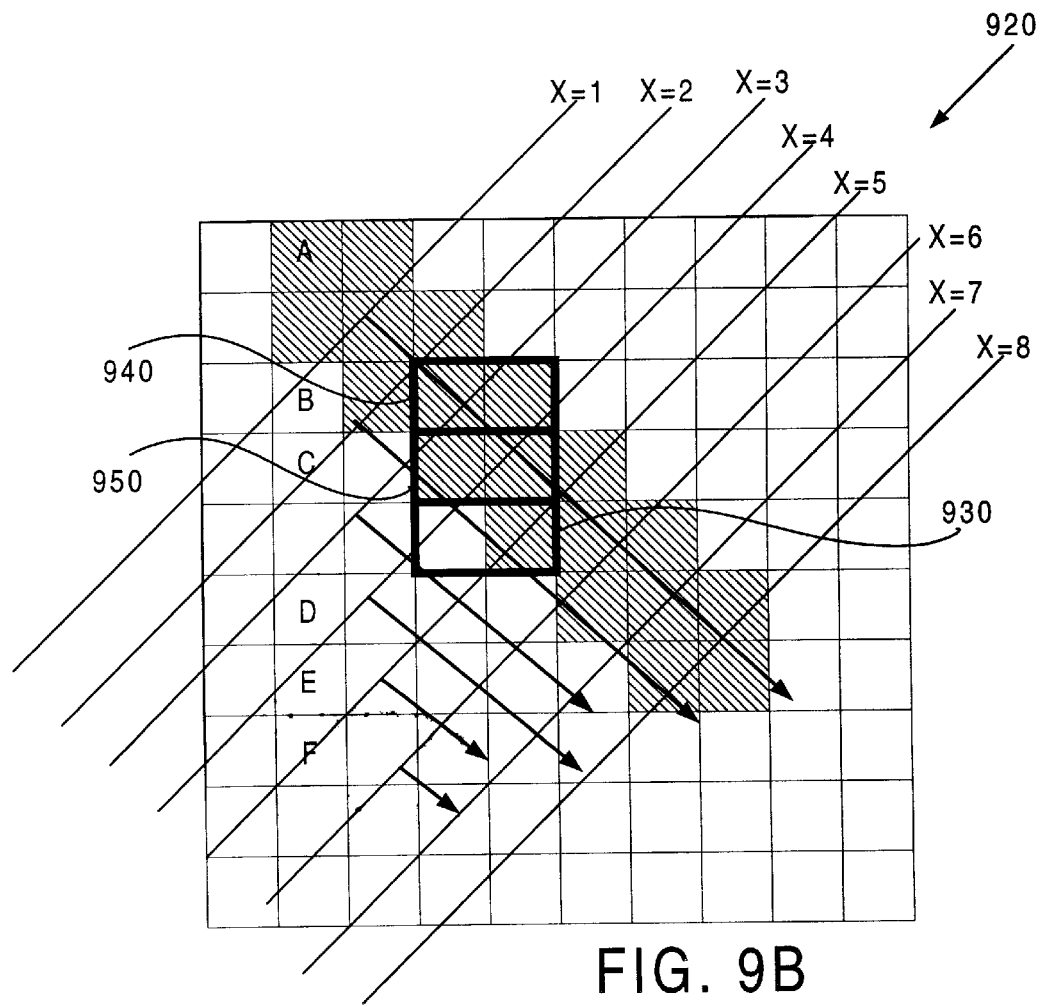
FIG. 9B is a graphical representation of the texture map being used for mapping texture values to the FIG. 9A screen image.

FIGS. 9A and 9B are graphical representations of a line-to-line redundancy coherence pattern. FIG. 9A illustrates a screen image block 910, for example, block 0 of FIG. 8. A triangle as shown by the bolded region within screen image portion. 910 is divided into lines A–F. Each line A–F is individually traced, preferably from left to right and successively from top to bottom as indicated by the solid arrows. Based on each coordinate (X,Y), a texture look-up coordinate for each pixel of each line is computed. An example pixel is arbitrarily selected in line B at X=4. The pixels of screen image portion line A are shaded for easy reference.

FIG. 9B is a graphical representation of a texture map 920 illustrating line-to-line texel redundancy. The texels retrieved to compute bi-linear texture values for line A are shaded for easy reference. Although the screen image pixels are situated in horizontal scan lines, the corresponding texels are situated in a negative slope, which illustrates that pixel and texel memory orientations are not necessarily aligned.

As an example, when determining bi-linear texture values for the successive line B, as shown in FIG. 9A, a pixel is selected in line B at X=4. The bottom four texels bounded by box 930 (FIG. 9B) represent the texels needed to perform bi-linear sampling for a pixel in line B at X=4. The top four shaded texels bounded by box 940 represent the texels retrieved previously for a pixel in line A at X=4. The middle two texels bounded by box 950 represent the two previously accessed texels overlapping between boxes 930 and 940.

As an optimization, it is possible to examine both the adjacent lines at X=3 and X=5 for previously accessed texels. It is possible to determine that the gradients in U and V suggest that it is only worthwhile to examine the adjacent line at X=5. By limiting the number of tags to adjacent lines correlated through screen space coordinates that texel cache system 650 examines, only a few read ports to the cache tags are required and only a few texels need to be read. Therefore, the tag storage memory can be a conventional multi-port register array, which is available in most modern ASIC cell libraries, as opposed to a content addressable memory (CAM) which is not typically available. Another advantage of limiting the tag aperture is that, since the tag requests only need to be matched against a limited number of tag entries, only a limited number of comparators are needed, as opposed to a CAM array which has one comparator per tag.

The line-to-line technique typically locates between one and two redundant texels for each new texel being mapped. Thus, if the most-recently retrieved texels technique finds on average two redundant texels and the line-to-line technique finds one redundant texel for bi-linear sampling, then only one texel will need to be retrieved from graphics memory 655.

Figure 10:
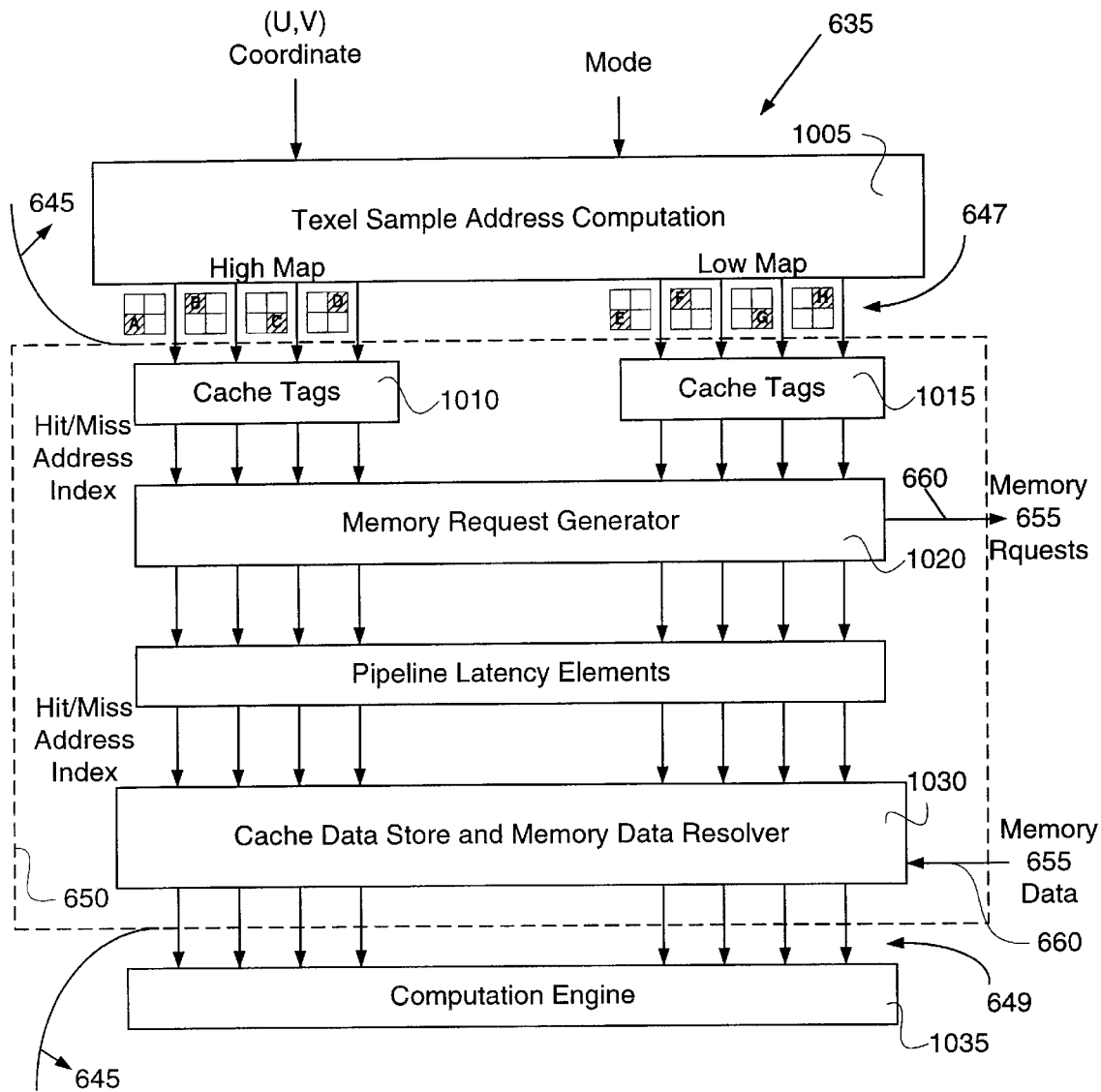
FIG. 10 is a block diagram detailing the FIG. 6 graphics accelerator system.

FIG. 10 is a block diagram detailing graphics accelerator system 635, which includes cache tags 1010, cache tags 1015, a memory request generator 1020, pipeline latency elements 1025 and cache data store and memory data resolver 1030. A texel sample address computation block 1005 receives a coordinate (U,V) and, for bi-linear sampling, determines the appropriate four sample points A–D from the nearest more-detailed (higher resolution) map. In tri-linear sampling mode, block 1005 also determines the four sample points E–H from the nearest less-detailed (lower resolution) map. Texel sample address computation block 1005 forwards the higher resolution sample points A–D to cache tag block 1010 and forwards the lower resolution sample points E–H to cache tag block 1015. Since the lower resolution map sampling stride is preferably about half of the higher resolution map sampling stride, cache tag block 1015 may be half the size of cache tag block 1010. Cache tag blocks 1010 and 1015 each determine whether requested texel values are stored in cache data store 1030.

If a hit occurs, then cache tag blocks 1010 and 1015 forward a cache read address through memory request generator 1020 and through pipeline latency elements 1025 to cache data store 1030. Cache data store 1030 responsively outputs on lines 649 the texture values cached in the read location.

If a miss occurs, then cache tag blocks 1010 and 1015 forward a cache write address to memory request generator 1020. Memory request generator 1020 generates memory requests for all misses (up to four for bi-linear sampling and up to eight for tri-linear sampling), and forwards the requests to DRAM 655 for information retrieval. DRAM 655 returns the memory data on bus 660 to cache data store and memory data resolver 1030, which stores the memory data at the write address. If the interface to DRAM 655 is 32-bits wide, the texture mode indicates a 16-bit per pixel texture lookup and the data is conveniently aligned in the texture map, then it is possible to satisfy two lookup requests with a single read request. However, if the data is not aligned, then two read requests are needed.

Because memory request generator 1020 is between cache tag blocks 1010, 1015 and cache data store 1030, generator 1020 can perform DRAM 655 memory requests before the address and instruction information reach cache data store and memory data resolver 1030. Once memory requests are generated, there is, depending on the DRAM design, a constant latency of about five to ten clock cycles (or possibly more) which includes time for exiting and reentering the graphics pipeline hardware, to effect a page hit. Therefore, graphics accelerator system 635 includes pipeline latency elements 1025 to coordinate arrival of the memory data and of the associated instructions at cache data store and memory data resolver 1030.

Cache data store and memory data resolver 1030 receive the incoming memory data and incoming cache tag data, and store the values in cache memory. Resolver 1030 formats and presents the data to a computation engine 1035, such as an Arithmetic Logic Unit (ALU). Reformatting data includes re-sizing texel data types, e.g., 16 to 32 bits per texel, and converting various color space representations, e.g., luminance/chrominance format (YUV) to Red/Green/Blue format (RGB).

Figure 11:
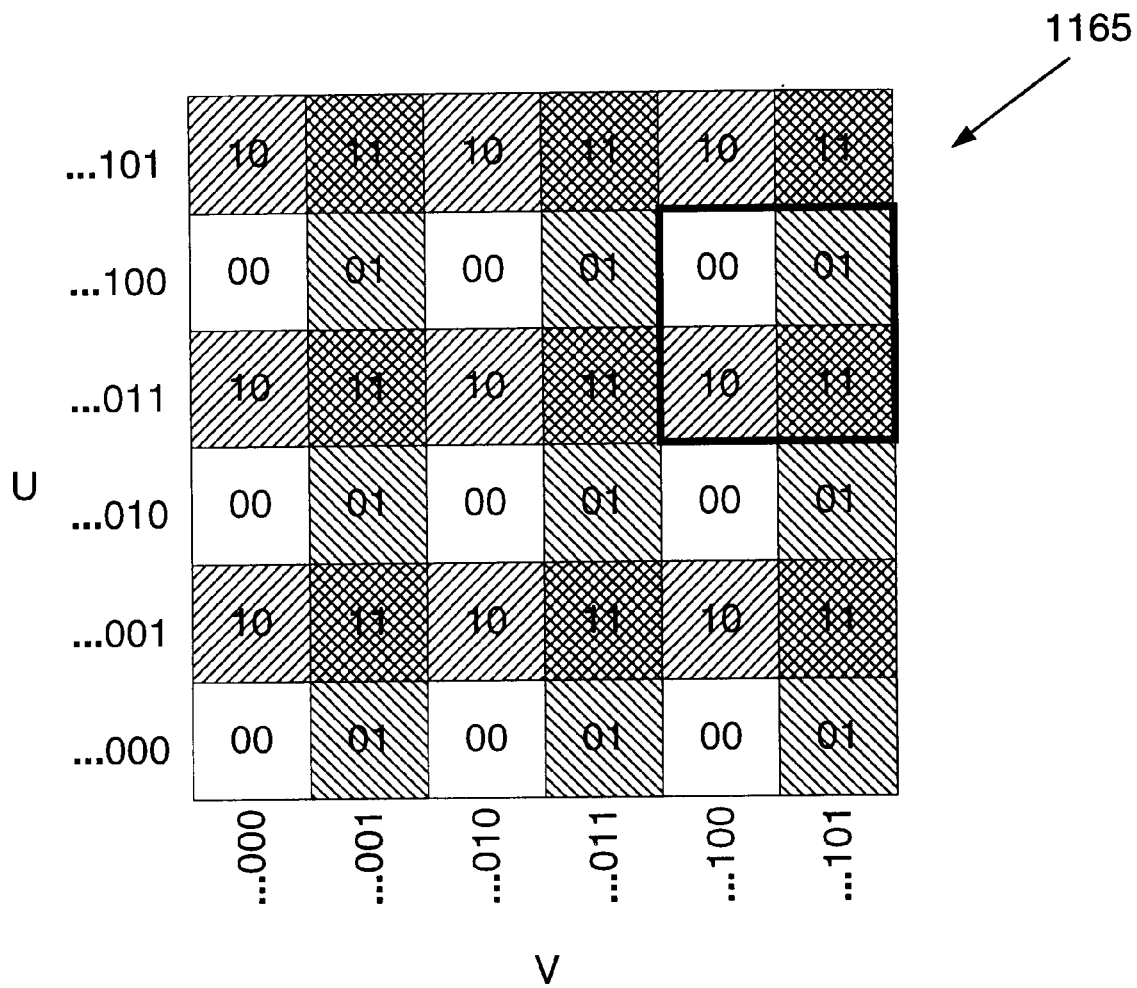
FIG. 11 is a graphical representation of an exemplary texel map being used to illustrate texel alignment.

FIG. 11 is a graphical representation of texel alignment on an exemplary texel map 1165. Texel alignment is based on the least significant bits of the texel map coordinates (U,V). The least significant addresses bits for the U-axis and for the V-axis are shown along respective axes of texel map 1165. The digit on the left side within each texel is the least significant bit of the U address, and the digit on the right side is the least significant bit of the V address. It will be appreciated that any square of four contiguous texels yields the representative combination 00, 01, 10 and 11. Because of this characteristic, the bi-linear texel sampling can be indexed to and performed by four different tag sets, as described below with reference to FIG. 12 and FIG. 14.

Figure 12:
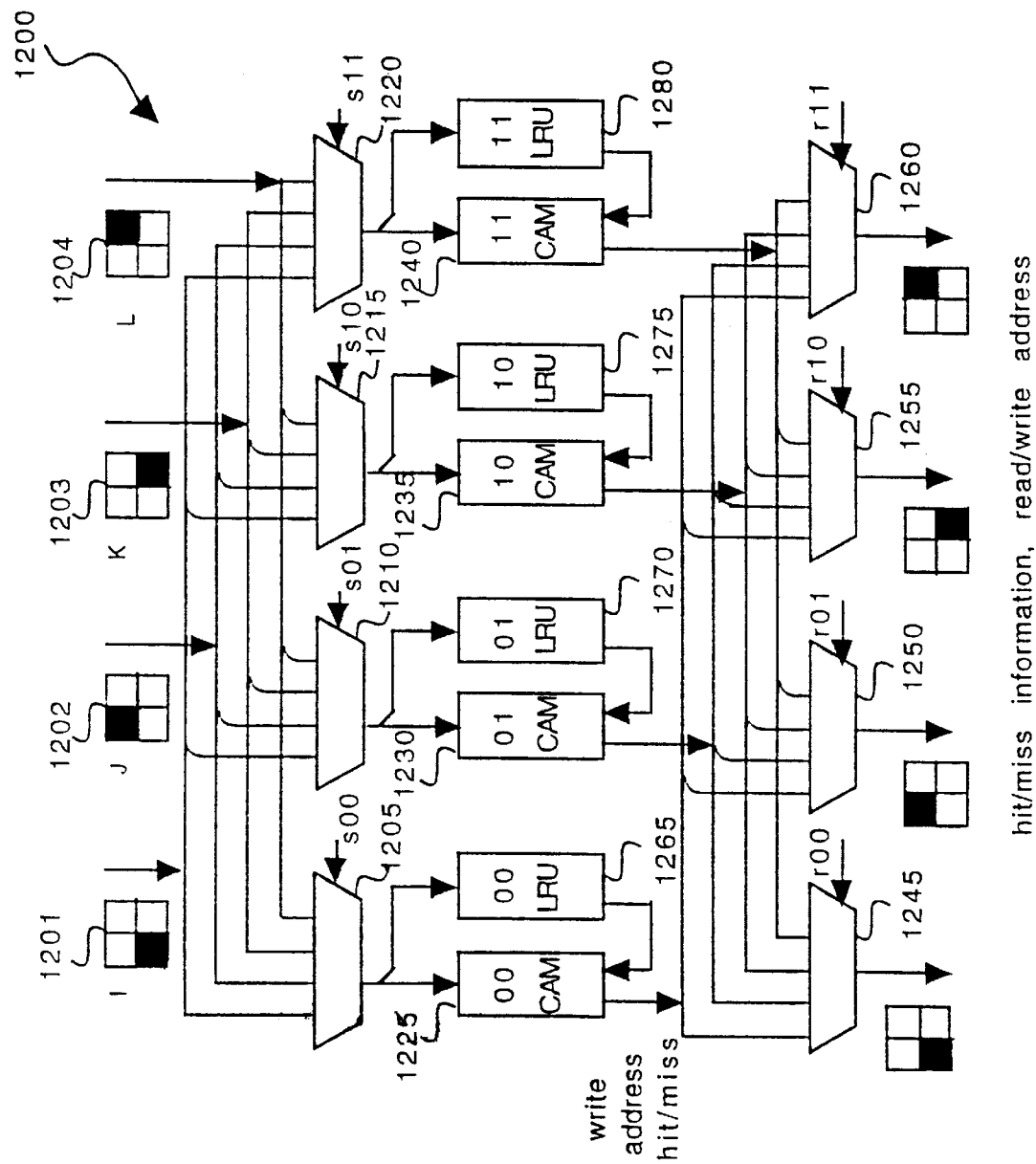
FIG. 12 is a block diagram illustrating details of FIG. 10 cache tag blocks in an implementation as a fully associative tag cache.

FIG. 12 is a block diagram illustrating details of cache tag blocks 1010 and 1015 in an implementation as a fully associative tag cache 1200. Tag cache block 1200 includes multiplexers 1205, 1210, 1215 and 1220, which receive four respective bi-linear sampling texel addresses. (I, J, K, L) and the respective texel locations 1201, 1202, 1203 and 1204 from the bi-linear unit square. MUXes 1205–1220 divide the four bi-linear texel addresses into four separate tag requests by aligning the texel addresses according to the least significant address bits of their horizontal and vertical texel map coordinates (U,V), namely, s00, s01, s10 or s11, and deliver the requests to Content Addressable Memories (CAMs) 1225, 1230, 1235 and 1240. CAMs 1225–1240 compare the texel addresses with previously sampled texel addresses stored therein.

If an address comparison indicates a hit, then the respective CAM 1225–1240 forwards a hit and cache read address pointing to a texel sample location in cache data store and memory data resolver block 1030 (FIG. 10) to the appropriate MUX 1245, 1250, 1255 or 1260. If a miss occurs, then the respective CAM 1225–1240 forwards a cache write address, preferably the Least Recently Used (LRU) address, for storing a new texel sample retrieved from texture map. Cache tag blocks 1010, 1015 each include an LRU engine 1265, 1270, 1275 or 1280 for the respective CAM 1225–1240 to compute the least recently used cache address. MUXes 1245–1260 receive the cache address and compare the least significant address bits with logic inputs r00, r01, r10 and r11, to reorder the addresses, based on their texel positions, back to their original order.

The fully associative cache solution as applied in FIG. 10 is relatively costly in terms of hardware and CAM elements are not generally available in most ASIC libraries. Accordingly, a limited texel caching approach as described below with reference to FIGS. 13–15 is preferred over a fully associative cache.

Figure 13:
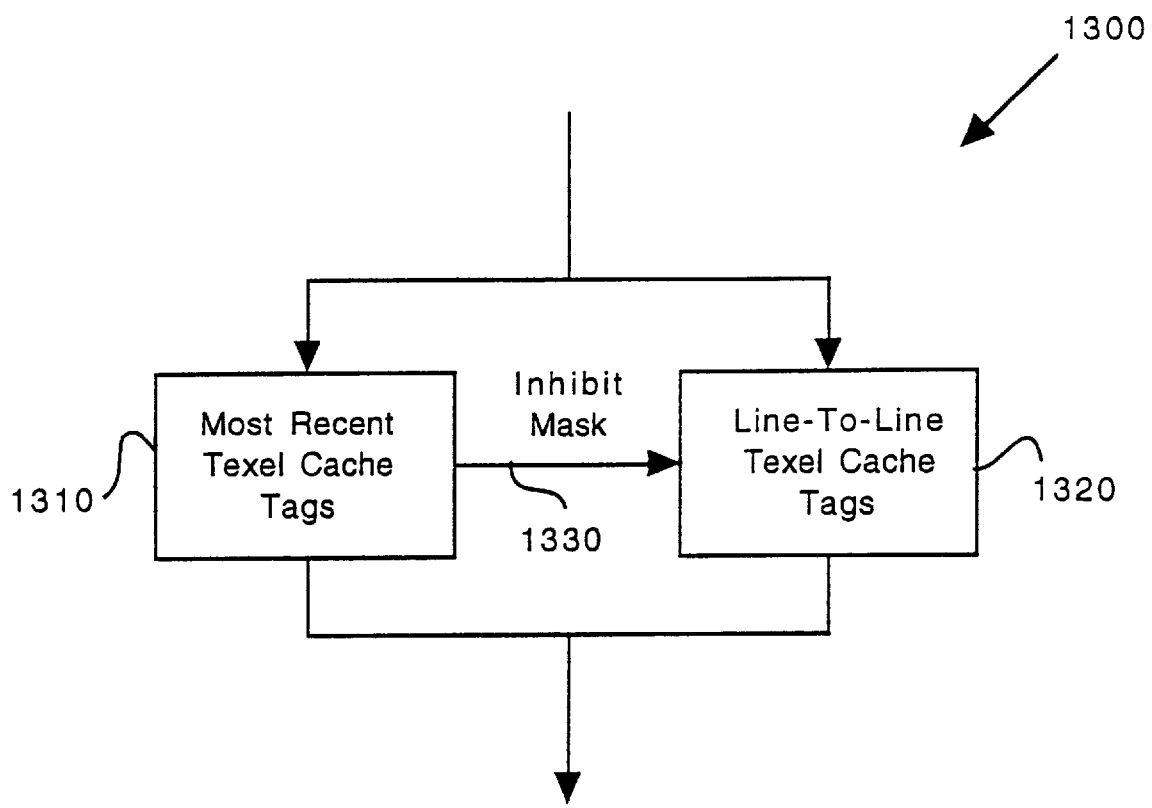
FIG. 13 is a block diagram illustrating details of FIG. 10 cache tag blocks in an implementation as bi-modal texel cache tag block.

Instead of using the FIG. 12 fully associative cache architecture, system 635 cache tag blocks 1010, 1015 can be implemented as shown in FIG. 13 using bi-modal texel cache tag block 1300, which includes the most recent texel cache tags in block 1310 and the line-to-line texel cache tags in block 1320. The most recent texel cache tag block 1310 maintains the most-recently retrieved texels for a particular sampling point. Upon receipt of a bi-linear texel sample request, most recent texel cache tag block 1310 performs the tag comparison and update functions to determine if the most recently retrieved four texels include any of the requested texels, and accordingly returns hit/miss information. Line-to-line texel cache tag block 1320 maintains texels retrieved for the previous scan line of a screen block. Upon receipt of a bi-linear texel sample request, line-to-line texel cache tag block 1320 performs tag comparison and update functions to determine if the previous line of texels includes any of the requested texels, and accordingly returns hit/miss information.

Bi-modal texel cache tag structure 1300 further includes an inhibit mask bus 1330 for forwarding hit/miss information from the most recent texel cache tag block 1310 to the line-to-line texel cache tag block 1320. Line-to-line texel cache tag block 1320 uses the hit/miss information to compare the redundant texels that it has found with the redundant texels that the most recent texel cache tag block 1310 has found. If a line-to-line redundant texel is included in the most-recently retrieved texels, then line-to-line texel cache tag block 1320 discards the duplicate. Thus, if line-to-line texel cache tag block 1320 supports only one match, then tag block 1320 compares the remaining texels to locate a unique texel hit. As stated above, by maintaining the most-recent four texels and the previous line of texels, texture mapping hardware 645 (FIG. 6) avoids retrieving from texture map DRAM 655 approximately seventy-five percent or more of the required texels.

Figure 14:
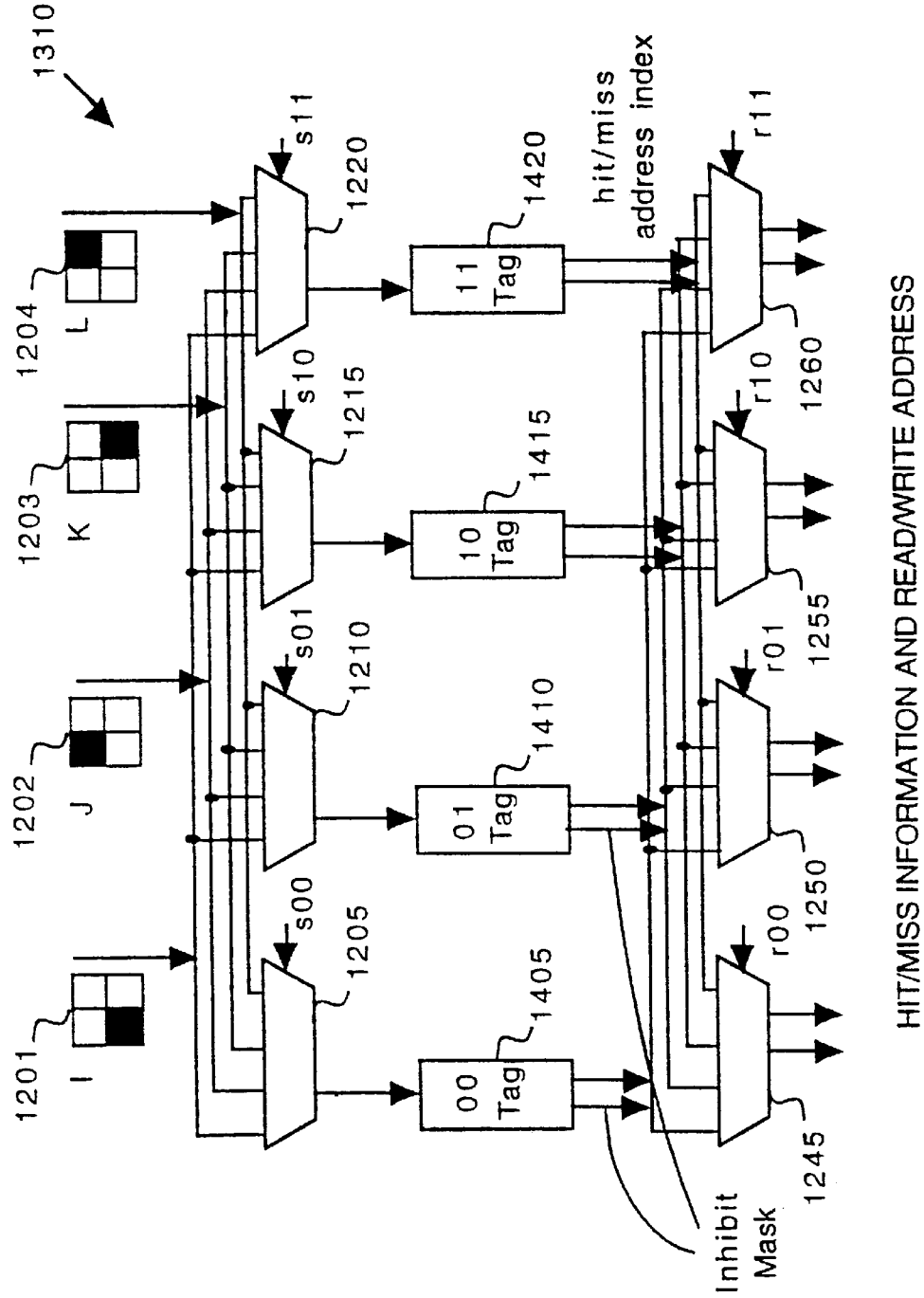
FIG. 14 is a block diagram illustrating details of the FIG. 13 most recent texel cache tag block.
Figure 15:
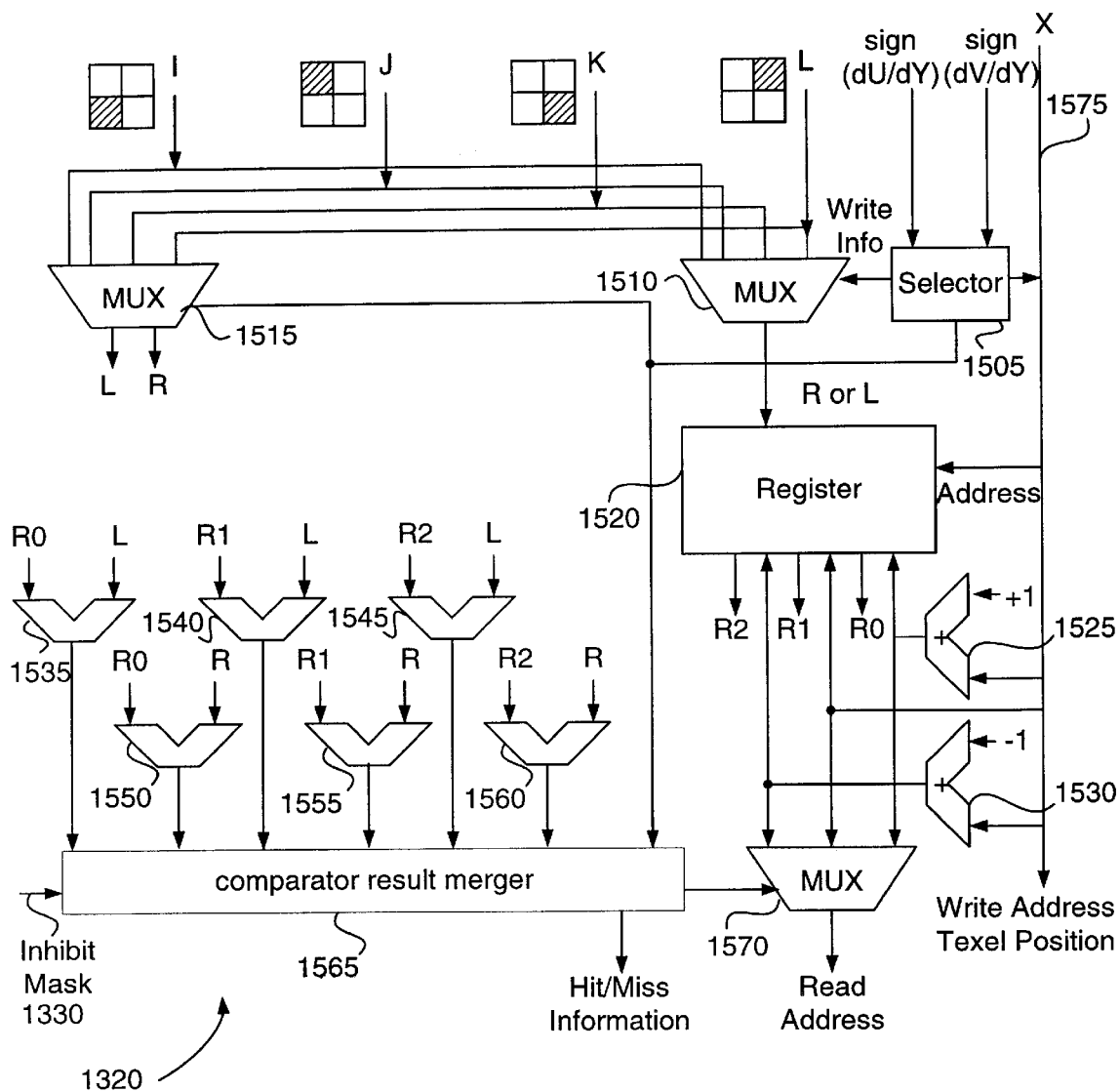
FIG. 15 is a block diagram of the FIG. 13 line-to-line texel cache tag structure.

FIG. 14 is a block diagram illustrating details of the most recent texel cache tag block 1310. Similarly to the fully associative cache tag structure 1200 described with reference to FIG. 12, cache tag block 1310 includes four multiplexers 1205, 1210, 1215 and 1220, which receive bi-linear sampling texel addresses (I, J, K, L) and the texel locations 1201, 1202, 1203 and 1204 within the bi-linear unit square. MUXes 1205–1220 index the four bi-linear texel addresses into four separate tag requests by aligning the texel addresses according to the least significant address bits of their horizontal and vertical texel map coordinates (U,V), namely, s00, s01, s10 or s11, and forward the requests to respective tag units 1405, 1410, 1415 or 1420.

Tag units 1405–1420 compare the addresses with previously sampled texel addresses currently stored in tag units 1405–1420. Each of tag units 1405–1420 stores one tag address. If a hit(s) occurs, then a hit signal and a read address pointing to the texel sample location in cache data store and memory data resolver block 1030 (FIG. 7) are delivered to the respective MUXes 1245–1260. If a miss occurs, then a miss signal is delivered and the requested address gets stored as the current most recent tag address. MUXes 1245–1260 receive the addresses and compare the least significant address bits with logic inputs r00, r01, r10 and r11 to reorder the addresses based on their texel positions back to their original order.

FIG. 15 is a block diagram of line-to-line texel cache tag structure 1320 for implementing bi-modal graphics accelerator system 635. Line-to-line texel cache tag block 1320 includes a selector 1505, a first MUX 1510, a second MUX 1515, a register 1520, adders 1525 and 1530, comparators 1535, 1540, 1545, 1550, 1555 and 1560, a comparator result merger 1565 and a MUX 1570.

MUXes 1510 and 1515 receive four bi-linear texel addresses I–L and each texel position. Selector 1505 receives the sign of a texture map U gradient in Y (dU/dY) and the sign of a texture map V gradient in Y (dV/dY). By examining dV/dY, selector 1505 enables MUX 1515 to automatically discard two of the four bi-linear samples I–L as not previously accessed, and enables MUX 1510 to select one of the four bi-linear samples for caching. More particularly, from dV/dY, selector 1505 determines whether a sampling trace is above or below the previous trace. If the next trace is below the current trace, then selector 1505 causes MUX 1515 to discard the upper two bi-linear texels and to select the lower two Left (L) and Right (R) texels for comparison with previously stored texels. Similarly, if the next trace is above the current trace, then selector 1505 causes MUX 1515 to discard the lower two bi-linear texels and to select the upper two Left (L) and Right (R) texels for comparison. Accordingly, MUX 1515 passes R and L to comparators 1535–1560.

By examining dU/dY, selector 1505 determines which of the two selected texels is more likely to be redundant in a future trace. If for the current X value on the next trace the texel sample is to the right, then selector 1505 causes MUX 1510 to maintain the right bi-linear texel. Similarly, if the next texel sample is to the left, then selector 1505 causes MUX 1510 to maintain the left bi-linear texel. Unless the texel stride is very small, the line cache texel sample tends not to be one of the texel samples found by the most-recently-retrieved texel cache tag block 1310 for the next trace. As illustrated, only one texel per X coordinate is maintained. However, two texels could be stored at the cost of doubling the size of the tag registers. Upon selecting the cache texel, selector 1505 forwards the texel position to the address X bus 1575.

MUX 1510 passes the selected right or left cache texel to register 1520 for storage at address X. The cache texel tag address is preferably stored in the same register location as the texel from the previous trace. However, replacement does not occur until a subsequent clock cycle. In the meantime, register 1520 receives addresses X–1, X and X+1, and accordingly passes each of the previously stored texel addresses R0, R1 and R2 sampled from the previous screen trace to two of comparators 1535–1560.

Comparators 1535–1560 compare each of the selected texels L and R against the three texel addresses R0, R1 and R2. Since MUX 1515 passes only two bi-linear texel samples for comparison against the read addresses R0, R1 and R2, then only six comparators 15351560 are needed. Comparators 1535–1560 forward the results of the comparison to comparator result merger block 1565. Along with the comparison results comparator merger block 1565 receives the inhibit mask on line 1330 from most recent texel cache tag block 1310 (FIG. 13), and accordingly generates hit/miss information. Using the inhibit mask, comparator merger block 1565 determines whether a hit from a redundant texel has already been found by most recent texel cache tag block 1310. If a unique hit occurs, comparator result merger 1565 delivers a control signal to MUX 1570 for selecting the hit address R0, R1 or R2 as a read address. If a miss or a duplicate hit occurs, then the address X is used as the write address for the next texel to be cached.

For example, examining a first trace results in storing a selected texel from each bi-linear sample. Upon receipt of the first sample of the second trace, selector 1505 and MUX 1510 select and forward a new cache texel for storage. Before storing the new cache texel, register 1520 receives the previous addresses X–1, X and X+1 and accordingly forwards previously stored addresses R0, R1 and R2 to comparators 1535–1560. If register 1520 is configured to store thirty-two texels, R0 represents the second texel of the first trace, R1 represents the first texel of the first trace, and R2 represents the thirty-second texel of the first trace (the preferred embodiment wraps). The new cache texel for the second trace will be stored in the location of the first texel for the first trace. For the second sample in the second trace, R0 will be the first sample of the first trace, R1 will be the second sample in the first trace, and R2 will be the third sample in the first trace.

The foregoing description of the preferred embodiments of the invention is by way of example only, and variations of the above-described embodiments and methods are provided by the present invention. Although the invention has been described with reference to bi-linear and tri-linear sampling, the invention can be implemented in graphics rendering systems which use two or more texels from a texel map to compute an appropriate texture value for a given pixel.

Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A texel caching system, comprising:
    texel memory storing texels;
    system memory storing a graphics application program for using interpolative sampling to render pixels of a graphical object;
    a memory request generator for retrieving needed texels from the texel memory;
    a cache data store coupled to the memory request generator for storing a number of the recently retrieved texels;
    a cache tag block coupled to the memory request generator for identifying the texels stored in the cache data store by aligning addresses of the needed texels according to address bits of the addresses' horizontal and vertical texel map coordinates, and for instructing the memory request generator to retrieve texels from the texel memory upon indication of a miss.

2. The system of claim 1 wherein the memory request generator is coupled between the cache tag block and the cache data store for performing a memory request before an address and instruction information associated with the needed texels reach the cache data store.

3. The system of claim 1, further comprising pipeline latency elements connected between the memory request generator and the cache data store for coordinating data arrival from the system memory, the texel memory, and the cache data store.

4. The system of claim 1 wherein the cache tag block comprises a fully-associative content addressable memory for determining, based on an aligned address, whether a texel is stored in the cache data store.

5. The system of claim 4, wherein the cache tag block further comprises a plurality of multiplexers for indexing the texels by aligning them based on the least significant texel memory address bits.

6. The system of claim 1, wherein the cache data store includes storage for a previously-retrieved line of texels.

7. The system of claim 1, wherein the cache data store includes storage for the four most-recently-retrieved texels.

8. The texel caching system of claim 1 wherein the cache tag block comprises:

a most-recent-texel-cache-tag block for maintaining most recently retrieved texels for a particular sample point; and a line-to-line-texel-cache-tag block for maintaining a previous line of texels.

9. The texel caching system of claim 8 wherein the most-recent-texel-cache-tag block determines whether the most-recently-retrieved texels include any requested texels, and responsively returns hit/miss information.

10. The texel caching system of claim 9 wherein the line-to-line-texel-cache-tag block uses the hit/miss information to determine whether there are redundant texels.

11. The texel caching system of claim 8 wherein the line-to-line-texel-cache-tag block determines whether the previous line of texels includes any requested texels, and responsively returns hit/miss information.

12. A texel caching system, comprising:

texel memory storing texels;

system memory storing a graphics application program for using interpolative sampling to render pixels of a graphical object;

a memory request generator for retrieving texels from the texel memory;

a first cache data store coupled to the memory request generator for storing only the four most-recently-retrieved texels; and a cache tag block coupled to the memory request generator for identifying the texels stored in the cache data store by aligning addresses of the needed texels according to address bits of the addresses' horizontal and vertical texel map coordinates, and for instructing the memory request generator to retrieve texels from the texel memory upon indication of a miss.

13. The system of claim 12 wherein the memory request generator is coupled between the cache tag block and the cache data store for performing a memory request before an address and instruction information associated with the needed texels reaching the cache data store.

14. The system of claim 12, further comprising pipeline latency elements connected between the memory request generator and the cache data store for coordinating data arrival from the system memory, the texel memory, and the cache data store.

15. The system of claim 12, wherein the cache tag block further comprises a plurality of multiplexers for indexing the texels by aligning them based on the least significant texel memory address bits.

16. The system of claim 12, further comprising a second texel cache for storing a previously-retrieved line of texels.

17. A method for caching most-recently-retrieved texels, comprising the steps of:

computing, by a graphics application program, the texels needed to perform interpolative sampling for a sampling point;

determining, by a cache tag block, whether each needed texel is stored in a cache data store, the cache tag block aligning addresses of the needed texels according to address bits of the addresses' horizontal and vertical texel map coordinates;

retrieving, by a memory request generator, the needed texels from a texel memory upon indication of a miss by the cache tag block; and caching a number of the retrieved texels in the cache data store upon indication of the miss.

18. The method of claim 17 wherein the memory request generator is coupled between the cache tag block and the cache data store for performing a memory request before an address and instruction information associated with the needed texels reach the cache data store.

19. The method of claim 17, wherein the step of caching a number of the retrieved texels includes determining a sample size needed for performing the interpolation sampling and storing the sample size in a memory.

20. A method for caching previously-retrieved texels for a line of graphical information, comprising the steps of:

partitioning graphical screen information into a plurality of regions;

selecting a first region from the plurality of regions;

caching texels in a cache data store for a first line of the first region;

computing the texels needed to perform interpolative sampling for a sampling point;

determining, by a cache tag block, whether each needed texel is stored in the cache data store, the cache tag block aligning addresses of the needed texels according to address bits of the addresses' horizontal and vertical texel map coordinates;

retrieving, by a memory request generator, the needed texels from a texel memory upon indication of a miss by the cache tag block; and caching one of the retrieved texels in the cache data store upon indication of the miss.

21. The method of claim 20 wherein the memory request generator is coupled between the cache tag block and the cache data store for performing a memory request before an address and instruction information associated with the needed texels reach the cache data store.

* * * * *